United States Patent [19]

Edwards et al.

[11] 4,179,421

[45] Dec. 18, 1979

[54] SILICA FILLED VULCANIZATES

[75] Inventors: Douglas C. Edwards; Kyosaku Sato, both of Sarnia, Canada

[73] Assignee: Polysar Limited, Sarnia, Canada

[21] Appl. No.: 883,742

[22] Filed: Mar. 6, 1978

[30] Foreign Application Priority Data

Apr. 14, 1977 [CA] Canada ................................ 276158

[51] Int. Cl.$^2$ .......................... C08K 3/36; C08K 5/09; C08K 5/17; C08L 15/00
[52] U.S. Cl. .......................... 260/23.7 M; 260/37 EP; 260/42.37; 260/42.47
[58] Field of Search ............ 260/42.37, 42.47, 23.7 M, 260/37 EP

[56] References Cited

U.S. PATENT DOCUMENTS

| | | | |
|---|---|---|---|
| 2,428,252 | 9/1947 | Von Stroh | 260/42.37 |
| 2,692,871 | 10/1954 | Pechukas | 260/42.37 |
| 2,764,572 | 9/1956 | Pechukas | 260/42.37 |
| 2,892,807 | 6/1959 | Sellers et al. | 260/41.5 |
| 3,240,841 | 3/1966 | Hsieh | 260/23.7 M |
| 3,664,403 | 5/1972 | Doran et al. | 106/288 B |
| 3,700,620 | 10/1972 | Burke | 260/33.6 AO |
| 3,867,326 | 2/1975 | Rivin et al. | 260/42.37 |
| 3,873,489 | 3/1975 | Thurn et al. | 260/42.47 |
| 3,903,030 | 9/1975 | Nordsiek et al. | 260/23.7 M |
| 3,928,282 | 12/1975 | Lohr et al. | 260/42.37 |
| 4,059,558 | 11/1977 | Golombeck et al. | 260/42.37 |

FOREIGN PATENT DOCUMENTS

| | | | |
|---|---|---|---|
| 232886 | 1/1960 | Australia | 260/42.37 |
| 716631 | 8/1965 | Canada | 260/23.7 M |

OTHER PUBLICATIONS

Rubber Age (Sep.) 1955, pp. 875–883.
Rubber Chemistry and Technology, 1975 Jul./Aug., vol. 48, pp. 434–441.
Rubber Chemistry and Technology, 1976 Jul./Aug., vol. 49, pp. 703–706; 719–737 and 743–751.

*Primary Examiner*—Ronald W. Griffin
*Attorney, Agent, or Firm*—Stevens, Davis, Miller & Mosher

[57] ABSTRACT

A process, and the product thereof, is provided for the production of improved silica filled rubbery vulcanizates which process comprises mixing a vulcanizable hydrocarbyl polymer containing epoxy groups and silica, shearing the mixture at an elevated temperature, incorporating vulcanization active compounds and vulcanizing. The vulcanizates may be used where reinforced vulcanizates are required.

8 Claims, No Drawings

SILICA FILLED VULCANIZATES

This invention is directed to improved silica-filled rubbery vulcanizates. In particular, the polymer of the silica-filled vulcanizate contains certain selected groups which are caused to interact with the silica.

The effects due to the presence of fillers in polymer vulcanizates are well known. Comparison of a gum vulcanizate with a filled vulcanizate shows the improved strength and wear characteristics in the filled vulcanizate when the filler used belongs to the class known as reinforcing fillers. The types of fillers that may be compounded with polymers are quite diverse in nature, the selection of the type of filler being mainly dependent on the properties required of the vulcanizate derived therefrom, but are normally divided into reinforcing and non-reinforcing types. From the group of reinforcing fillers, two which have received the most attention are the various carbon blacks and silicas. Of these two types, carbon black is the most dominant because of price and the overall balance of vulcanizate properties.

There has existed a desire to improve the characteristics of silica-filled vulcanizates and to make them more closely equivalent to carbon black filled vulcanizates. This desire arises partly from the fact that light coloured vulcanizates, which obviously cannot contain carbon black, have a definite place in the market and partly from the fact that silica does not depend, in principle, upon the use of hydrocarbons for its manufacture. Any attempt to improve the properties of silica-filled vulcanizates to more closely match the properties of carbon black filled vulcanizates is thus timely and would fill a need long recognized by the industry.

Vulcanizates obtained from silica-filled polymers, while having certain useful properties, are known to be deficient due to being boardy, which may be described as a stiffness at low elongations and lack of resilience, and due to high tensile set, both of which deficiencies can be avoided in carbon black filled vulcanizates.

In attempts to overcome some of the deficiencies associated with the use of silica fillers in polymers, silica has been treated with a number of chemicals to modify the chemical nature of the surface of the silica particles. Thus, silica has been treated with diazomethane, with alcohols and with a range of organo-silanes including, for example, trimethylchlorosilane. However, these treatments, while leading to minor improvements, were not successful in overcoming the overall deficiencies.

Other chemical compounds have been mixed with silicapolymer systems for a different reason. Silica, due to its highly absorbtive surface, tends to preferentially absorb the chemical curing agents normally used which leads to undercuring during the vulcanization step. In order to overcome this problem, certain chemicals such as glycols, e.g., diethylene glycol or poly(ethylene glycol), amines, e.g., triethanolamine and guanidines have been added during the compounding steps and allow the use of normal levels of curing agents to achieve the expected level of cure. The overall aforementioned deficiencies are still found in such vulcanizates.

None of these chemical treatments or chemical additives have overcome the deficiencies associated with the use of silica as filler in polymeric vulcanizates.

A more recent improvement in the art of using silica as a filler for polymers is the use of coupling agents. Significant improvements in the vulcanizate properties can be attained when coupling agents are added. The majority of such coupling agents are organofunctional silanes; titanium-containing compounds are also known. Suitable organofunctional silanes include the mercaptosilanes. Vulcanizates containing mercaptosilanes added to the silica filler during the compounding stage generally show, in comparison with silica-filled vulcanizates not containing such silanes, increased values for modulus and tensile strength, and decreased elongation at break—generally, properties more comparable to the properties of carbon black filled vulcanizates. Although a number of coupling agents are commercially available, their cost is extremely high, making them not very practical for general use.

Thus, the problem still exists that silica-filled vulcanizates, of reasonable cost, cannot be produced to have acceptable strength, resilience and tensile set properties.

We have now discovered improved silica-filled rubbery vulcanizates and processes of preparing such improved silica-filled rubbery vulcanizates.

It is an objective of this invention to provide an improved silica-filled rubbery vulcanizate, wherein the vulcanizate exhibits improved physical properties including at least one of, and preferably at least two of higher 300% modulus and tensile strength, lower 25% modulus, lower Young's modulus, lower tensile set and lower hardness.

It is a further objective of this invention to provide a process for the preparation of improved silica-filled rubbery vulcanizates, wherein the silica is mixed prior to the vulcanization step, with a rubbery polymer containing selected functional groups, said mixing being at an elevated temperature and under shearing conditions.

In accordance with the invention, we have found a process for the production of improved silica filled rubbery vulcanizates which process comprises preparing a mixture comprising per 100 parts by weight of a vulcanizable hydrocarbyl polymer containing epoxy groups and from about 5 to about 100 parts by weight of silica, subjecting said mixture to a treatment wherein it is sheared at an elevated temperature, cooling said mixture, incorporating into said mixture vulcanization active compounds and vulcanizing by heating at an elevated temperature to produce the improved silica filled rubbery vulcanizate.

Further, in accordance with the invention, we have found a process for the production of improved silica filled rubbery vulcanizates which process comprises preparing a mixture comprising per 100 parts by weight of a vulcanizable hydrocarbyl polymer containing from about 4 to about 60 millimoles of epoxy groups per 100 grams of polymer, from about 5 to about 100 parts by weight of silica and optionally from about 0.5 to about 5 parts by weight of an additive selected from the sodium, potassium, zinc, calcium or ammonium salts of the $C_{15}$–$C_{20}$ fatty acids or from amines of formula

RNH$_2$, R—NHR' and R—NR"R'"

where R is a $C_4$–$C_{30}$ linear or branched alkyl or alkylene group which may contain up to three NH$_2$, NH or NR" groups, R' is a $C_4$–$C_{30}$ linear or branched alkyl or alkylene group and R" and R'", which may be the same or different, is a $C_1$–$C_{10}$ alkyl group, subjecting said mixture to a treatment wherein it is sheared for about 0.25 to about 10 minutes at a temperature of about 100° to about 175° C., cooling said mixture, incorporating into said mixture vulcanization active compounds and vulcanizing by heating at an elevated temperature to produce the improved silica filled rubbery vulcanizate.

Still further in accordance with the invention, there is provided an improved silica filled rubbery vulcanizate obtained by the vulcanization of a mixture comprising per 100 parts by weight of a vulcanizable hydrocarbyl polymer containing epoxy groups and from about 5 to about 100 parts by weight of silica, said mixture having been subjected to shearing at an elevated temperature prior to incorporation of vulcanization active compounds and vulcanization.

Still further in accordance with the invention, there is provided an improved silica filled rubbery vulcanizate obtained by the vulcanization of a mixture comprising per 100 parts by weight of a vulcanizable hydrocarbyl polymer containing from about 4 to about 60 millimoles of epoxy groups per 100 grams of polymer, from about 5 to about 100 parts by weight of silica and optionally from about 0.5 to about 5 parts by weight of an additive selected from the sodium, potassium, zinc, calcium or ammonium salts of the $C_{15}-C_{20}$ fatty acids or from amines of formula

R—NH$_2$, R—NHR' and R—NR"R'"

where R is a $C_4-C_{30}$ linear or branched alkyl or alkylene group which may contain up to three NH$_2$, NH or NR" groups, R' is a $C_4-C_{30}$ linear or branched alkyl or alkylene group and R" and R'", which may be the same or different, is a $C_1-C_{10}$ alkyl group, said mixture having been subjected to shearing for about 0.25 to about 10 minutes at a temperature of from about 100° to about 175° C. prior to incorporation of vulcanization active compounds and vulcanization.

In order to establish whether improved vulcanizate properties are achieved, it is necessary to be able to define these properties in measurable quantities. For vulcanizates of polymeric materials, the conventional type of stress-strain measurement supplies much useful information. Prior art silica-filled vulcanizates exhibit, in comparison with carbon black filled vulcanizates, a higher modulus at low degrees of extension (e.g., 25% strain) and a lower modulus at high degrees of extension (e.g., 300% strain). By means of slow rate extension tests, the modulus at 25% extension is readily determined. Further, the slope of the stress-strain curve at zero extension can also be determined; this is the Young's modulus. The Young's modulus and the 25% modulus illustrate the stiffness at low elongations. Stress-strain tests conducted at the conventional rate of extension provide the 100% modulus, the 300% modulus, the elongation at break and the tensile strength. On completion of a stress-strain test, the two ruptured pieces of the test specimen are, ten minutes after rupture, carefully fitted together so that they are in contact over the full area of the break—the distance between the two bench marks is measured. The tensile set is the extension remaining in the test piece and is expressed as a percentage of the original test piece length. Thus, test procedures are known whereby it is readily possible to quantify the quality of the vulcanizates.

The polymers which may be used in the present invention are vulcanizable hydrocarbyl polymers which contain functional groups attached to the polymer chain. The functional groups are epoxy groups and may be attached either directly to the polymer chain or may be attached to the polymer chain through a hydrocarbyl group. Suitable hydrocarbyl polymers are essentially $C_4-C_6$ conjugated diolefin polymers and polymers of $C_4-C_6$ conjugated diolefins and at least one other copolymerizable vinyl or vinylidene-containing monomer. Examples of such suitable polymers include polybutadiene, polyisoprene, butadiene-styrene polymers, isoprene-styrene polymers, butadiene-acrylonitrile polymers, butadiene-methacrylonitrile polymers and isopreneacrylonitrile polymers. All the polymers are solid high molecular weight materials, having Mooney viscosities within the range of about (ML 1+4 at 100° C.) 30 to about 105. The functional groups may be incorporated into the polymers by copolymerization of suitable monomers or by chemical modification of the polymer. Incorporation of the functional groups by copolymerization can only be achieved in an emulsion free radical polymerization system whereas incorporation of the functional groups by chemical modification can be achieved with polymers prepared by emulsion free radical polymerization and with polymers prepared by other methods of polymerization. One of average skill in the art will be able to readily relate monomers suitable for emulsion free radical polymerization. Suitable copolymerizable monomers are olefin-epoxide monomers including glycidyl acrylate, glycidyl methacrylate, vinyl cyclohexene monoxide, allyl glycidyl ether and methallyl glycidyl ether. Suitable chemical modification may include partial epoxidation of carboncarbon double bonds in a polymer containing unsaturation. Thus the polymers which may be used in this invention are the vulcanizable hydrocarbyl polymers hereinbefore described and containing epoxy groups attached to the polymer chain.

The concentration of the bound functional groups in the polymer will be from about 4 millimoles per 100 grams of polymer to about 60 millimoles per 100 grams of polymer. Preferably, the concentration of the bound functional groups is from about 5 to about 40 millimoles per 100 grams of polymer. Suitable concentration of the functional groups can also be achieved by mixing a polymer having a concentration of bound functional groups of from about 10 to about 60 millimoles per 100 grams of polymer with a like polymer having no functional groups, the two polymers being mixed in such a ratio that the concentration in the mixture of functional groups is from about 4 to about 40 millimoles of functional groups per 100 grams of the mixture of polymers.

The silica which is mixed with the polymer to produce the compounds and vulcanizates of this invention is of fine particle size, that is to say generally less than about 0.1 micron but larger than about 0.01 microns average particle size. Such silicas are well known in the art and may be selected from the fumed silicas, which are relatively anhydrous, and from the precipitated silicas, which contain water of hydration. Preferably, the silica has an average particle size of 0.015 to 0.05 microns and is a precipitated silica.

The amount of silica which may be mixed with the polymer is from about 5 parts to about 100 parts by weight per 100 parts by weight of polymer. In normal practice, the higher concentration of silica, that is, from about 60 to about 100 parts by weight per 100 parts by weight of polymer, will be mixed with polymers which may contain hydrocarbon oil or hydrocarbyl plasticizer or to which hydrocarbon oil or hydrocarbyl plasticizer is added during the compounding state. Additional fillers, except carbon black, may also be added to the silica-polymer mixture, such additional fillers being selected from the generally non-reinforcing or semireinforcing fillers such as calcium carbonate, titanium dioxide, calcium sulphate, clays, silicates and from the carbon blacks. Such additional fillers may be present in amounts from about 5 to about 150, preferably from about 5 to about 80 parts by weight per 100 parts by weight of polymer. Carbon black may also be present at up to about 3 parts by weight per 100 parts by weight of polymer as a colouring agent.

Optionally, there may be added to the silica-polymer mixture, prior to the shearing at elevated temperature, from about 0.5 to about 5 parts by weight per 100 parts by weight of polymer of an additive selected from the sodium, potassium, zinc, calcium or ammonium salts of the $C_{15}$–$C_{20}$ fatty acids or from amines of formula

where R is a $C_4$–$C_{30}$ linear or branched alkyl or alkylene group which may contain up to three $NH_2$, NH or NR″ groups, R′ is a $C_4$–$C_{30}$ linear or branched alkyl or alkylene group and R″ and R‴, which may be the same or different, is a $C_1$–$C_{10}$ alkyl group. Examples of suitable fatty acids include palmitic acid and stearic acid. Examples of suitable amines include hexylamine, decylamine, octadecylamine, 1,1-dimethyl decylamine, 1,1-diethyl octadecylamine, octadecylene amine, N,N-dimethyl decylamine, N,N-diethyl octadecylamine, di(dodecyl)amine, hexamethylene diamine, tri-ethylene tetramine and N,N,N′,N′-tetramethyl hexamethylene diamine.

Preferred amines include the compounds of formula R–$NH_2$ and R–NHR′ wherein R is a $C_{10}$–$C_{20}$ linear or branched alkyl or alkylene group which may contain 1 $NH_2$ or NH group and wherein R′ is a $C_{10}$–$C_{20}$ linear or branched alkyl or alkylene group.

Preferably, the amount of such additive, when present in the silica-polymer mixture, is from about 1 to about 3 parts by weight per 100 parts by weight of polymer.

It is necessary that the silica-polymer mixture be subjected to a treatment wherein it is sheared at an elevated temperature. Such shearing may be achieved on a two roll rubber mill or in an internal mixer and may be during the mixing of the polymer and filler or as a subsequent step to such mixing. The elevated temperature is from about 100° to about 175° C., preferably from about 120° to about 160° C. The mixture is subjected to such treatment for a time of from about 0.25 to about 10 minutes, preferably from about 0.5 to about 5 minutes.

The mixing of the silica and polymer may be achieved using conventional rubber mixing equipment including two roll rubber mills and internal mixers. The subsequent addition after cooling from the shearing at elevated temperature, of other compounding ingredients and vulcanization active compounds is by means conventional in the rubber industry including, especially when vulcanization active compounds are involved, two roll rubber mills operated at relatively low temperatures, usually below about 65° C. Suitable vulcanization systems are chosen to match the nature of the polymer and the intended use for the vulcanizate and are well known in the industry. The nature of the vulcanization system is not critical to this invention. The compounds are vulcanized by heating at an elevated temperature, for example at temperatures of 125°–200° C. for times of from 1 minute to 10 hours, preferably at temperatures of 150°–170° C. for from 3 to 60 minutes.

The vulcanizates produced from the silica polymer mixtures of this invention possess significantly improved physical properties when compared with comparable prior art vulcanizates except those containing an organofunctional coupling agent. Comparison of the vulcanizates of this invention when they contain 50 parts by weight of silica per 100 parts by weight of polymer with prior art vulcanizates also containing 50 parts of silica, shows that the vulcanizates of the present invention have at least one of and preferably at least two of the following properties: a reduced Young's modulus, a reduced modulus at 25% extension, an increased modulus at 300% extension, an increased tensile strength and a reduction in the tensile set. Preferably, the vulcanizates of this invention will have a reduced Young's modulus and a reduced 25% modulus and most preferably the vulcanizates will have a reduced Young's modulus, a reduced 25% modulus, an increased 300% modulus and a reduced tensile set.

The following examples are provided to illustrate, but not limit, the invention and all parts are parts by weight unless otherwise stated.

EXAMPLE 1

Using conventional free radical emulsion polymerization techniques for polymerization at 10° C., a series of polymers were prepared which contained from 0 to about 2 weight percent of glycidyl methacrylate, about 34 weight percent of acrylonitrile, the balance being butadiene.

Samples of these polymers were compounded with 50 parts by weight per 100 parts by weight of polymer of a fine particle silica (HiSil* 233). Portions of these compounds were heat treated by shearing on a rubber mill for three minutes at 150° C. The remainder of the compounds was not so heat treated.
*Registered Trade Mark After cooling to ambient temperatue, each of the compounds was put back onto a rubber mill operated at about 40° C. and dicumyl peroxide (DiCup* 40C) was added and thoroughly dispersed. These compounds were then vulcanized by heating at 160° C. for 30 minutes.

Table I records the compounds, whether they were subjected to heat treatment, the quantity of dicumyl peroxide (in parts by weight per 100 parts by weight of polymer) added and the properties of the vulcanizates.

The results show that even at a bound glycidyl methacrylate level of about 0.5 weight percent, the vulcanizate exhibits improved properties when the compound has been heat treated; when the glycidyl methacrylate level in the polymer is about 1 weight percent, very marked improvements in the vulcanizate properties are achieved. Experiment No. 1 is a control and is representative of the state of the art using silica fillers and a polymer not containing epoxy groups.

TABLE I

| Experiment No. | 1 | 2 | | 3 | 4 | | 5 | |
|---|---|---|---|---|---|---|---|---|
| Bound GMA wt. % | 0 | 0.5 | | 0.7 | 1.0 | | 2.0 | |
| | | A | B | | A | B | A | B |
| Compound heat treated | Yes | No | Yes | Yes | No | Yes | No | Yes |
| Quantity of dicumyl peroxide wt. % | 1.5 | 1.5 | 1.5 | 40 | 1.5 | 1.5 | 1.5 | 1.5 |

TABLE I-continued

| Vulcanizate properties | | | | | | | | |
|---|---|---|---|---|---|---|---|---|
| Tensile strength kg/cm$^2$ | 318 | 298 | <332 | 278 | 281 | 341 | 263 | 279 |
| Elongation % | 680 | 660 | 560 | 400 | 630 | 450 | 310 | 250 |
| 100% Modulus kg/cm$^2$ | 25 | 27 | 43 | 40 | 26 | 40 | 50 | 75 |
| 300% Modulus kg/cm$^2$ | 58 | 80 | <152 | 199 | 90 | 210 | 239 | — |
| 25% Modulus kg/cm$^2$ | 12 | 11 | 13 | 11 | 11 | 10 | 12 | 15 |
| Young's Modulus kg/cm$^2$ | 162 | 153 | >122 | 94 | 151 | 59 | 89 | 72 |
| Tensile set % | 25 | 23 | >15 | 5 | 15 | 7 | 5 | 4 |
| Hardness Shore A$_2$ | 78 | 85 | 79 | 78 | 85 | 75 | 85 | 77 |

EXAMPLE 2

A polymer of composition similar to that of Experiment No. 3 of Example 1, i.e., containing about 34 weight percent of acrylonitrile and about 1 weight percent of glycidyl methacrylate, was used.

One portion of the polymer was compounded with 60 parts by weight of silica, subjected to heat treatment by milling at 150° C. for 3 minutes, cooled, compounded with 3.5 weight percent of dicumyl peroxide (DiCup 40C) and vulcanized by heating at 160° C. for 30 minutes.

A second portion of the polymer was compounded with 60 parts by weight of silica, 2 parts by weight of zinc stearate and 12.5 parts by weight of di-octyl phthalate. It was then subjected to heat treatment by milling at 150° C. for 3 minutes, cooled, compounded with 5 parts by weight of zinc oxide, 1.5 parts by weight of stearic acid and 3.5 weight percent of dicumyl peroxide and vulcanized by heating at 166° C. for 15 minutes.

A third portion of the polymer was compounded with 60 parts by weight of silica, 2 parts by weight of zinc stearate and 12.5 parts by weight of di-octyl phthalate. It was then heat treated by milling at 150° C. for 3 minutes. After cooling, it was compounded with 5 parts by weight of zinc oxide, 1.5 parts by weight of stearic acid, 1.5 parts by weight of benzothiazyl disulphide, 0.5 parts by weight of tetramethyl thiuram disulphide and 1.75 parts by weight of sulphur and vulcanized by heating at 166° C. for 15 minutes.

The compounding recipes and vulcanizate properties are shown in Table II. The vulcanizate properties for Experiment No. 6 are very similar to those of Experiment No. 4B of Example 1, showing that the presence of other compounds during the heat treatment does not have a significant effect on the vulcanizate properties. Using a sulphur curing recipe yields vulcanizates having properties of similar improved characteristics as are found for vulcanizates obtained with a peroxide recipe.

TABLE II

| Experiment No. | 6 | 7 | 8 |
|---|---|---|---|
| Polymer wt. | 100 | 100 | 100 |
| Silica wt. | 60 | 60 | 60 |
| Zinc stearate wt. | — | 2 | 2 |
| Di-octyl phthalate wt. | — | 12.5 | 12.5 |
| Heat treated, 3 minutes at 150° C. | | | |
| Zinc oxide wt. | — | 5 | 5 |
| Stearic acid wt. | — | 1.5 | 1.5 |
| Benzothiazyl disulphide wt. | — | — | 1.5 |
| Tetramethyl thiuram disulphide wt. | — | — | 0.5 |
| Sulphur wt. | — | — | 1.75 |
| Dicumyl peroxide wt. | 3.5 | 3.5 | — |
| Vulcanization time mins. | 30 | 15 | 15 |
| Vulcanization temperature °C. | 160 | 166 | 166 |
| Vulcanizate properties | | | |
| Tensile strength kg/cm$^2$ | 369 | 250 | 311 |
| Elongation % | 440 | 400 | 450 |
| 100% Modulus kg/cm$^2$ | 34 | 28 | 25 |
| 300% Modulus kg/cm$^2$ | 238 | 180 | 182 |
| 25% Modulus kg/cm$^2$ | 8 | 7 | 8 |
| Young's Modulus kg/cm$^2$ | 58 | 54 | 70 |
| Tensile set % | 5 | 4 | 7 |
| Hardness Shore A$_2$ | 71 | 76 | 77 |

EXAMPLE 3

For comparison purposes, a commercially available butadiene-acrylonitrile polymer containing 34 weight percent of acrylonitrile and having a Mooney (ML 1+4 at 100° C.) of 50 was compounded with carbon black and DiCup* 40C and the vulcanizate properties were determined. The carbon black used was Vulcan*3. The vulcanizate properties are comparable to those obtained with the present invention and show that the present invention has overcome the prior problems due to the use of silica as filler.
*Registered Trade Mark

TABLE III

| Recipe | | |
|---|---|---|
| Polymer wt. | 100 | 100 |
| Carbon black wt. | 50 | 50 |
| Dicumyl peroxide wt. | 3.0 | 3.5 |
| Vulcanization-30 minutes at 160° C. | | |
| Vulcanizate properties | | |
| Tensile strength kg/cm$^2$ | 238 | 246 |
| Elongation % | 450 | 380 |
| 100% Modulus kg/cm$^2$ | 23 | 25 |
| 300% Modulus kg/cm$^2$ | 135 | 177 |
| 25% Modulus kg/cm$^2$ | 6 | 6 |
| Young's Modulus kg/cm$^2$ | 33 | 39 |
| Tensile set % | 9 | 5 |
| Hardness Shore A$_2$ | 70 | 71 |

EXAMPLE 4

A polymer of styrene (about 23 weight percent), butadiene and glycidyl methacrylate (about 1 weight percent) was prepared using a conventional free radical emulsion polymerization technique at a polymerization temperature of 10° C. A portion of the polymer was compounded with 50 parts by weight, per 100 parts by weight of polymer, of silica. This compound was then subjected to heat treatment on a rubber mill at 150° C. for 3 minutes. After cooling, 0.67 parts by weight, per 100 parts by weight of polymer, of dicumyl peroxide (DiCup* 40C) was added by mixing on a rubber mill at about 40° C. The final compound was vulcanized by heating at 160° C. for 30 minutes.
*Registered Trade Mark As a control, a sample (100 parts by weight) of a commercial styrene-butadiene polymer containing about 23 weight percent of styrene and having a Mooney (ML 1+4 at 100° C.) of about 51 was mixed with 50 parts by weight of silica and 0.5 parts by weight of an antioxidant, namely 2,6-ditertiary butyl-4-methyl-phenol. This was heat treated as above, 2.0 parts by weight of dicumyl peroxide were added and it was vulcanized as above.

As a second control, a further sample of the commercial styrene-butadiene polymer was treated as above except for the omission of the heat treatment step.

The compositions and vulcanizate properties are listed in Table IV. The marked reductions in the Young's modulus and tensile set for Experiment No. A, which is in accordance with the present invention, are readily seen.

TABLE IV

| Experiment No. | A | B | C |
|---|---|---|---|
| Styrene-butadiene-glycidyl methacrylate polymer wt. | 100 | — | — |
| Styrene-butadiene polymer wt. | — | 100 | 100 |
| Silica wt. | 50 | 50 | 50 |
| 2,6-ditertiary butyl-4-methyl-phenol wt. | — | 0.5 | 0.5 |
| Heat treat 150° C. for 3 min. | Yes | Yes | No |
| Dicumyl peroxide wt. | 0.67 | 2 | 2 |
| Vulcanizate properties | | | |
| Tensile strength kg/cm$^2$ | 189 | 220 | 188 |
| Elongation % | 480 | 450 | 450 |
| 100% Modulus kg/cm$^2$ | 15 | 30 | 35 |
| 300% Modulus kg/cm$^2$ | 90 | 126 | 106 |
| 25% Modulus kg/cm$^2$ | 4 | 11 | 15 |
| Young's Modulus kg/cm$^2$ | 28 | 145 | 205 |
| Tensile set % | 5 | 10 | 14 |
| Hardness Shore A$_2$ | 69 | 81 | 84 |

EXAMPLE 5

Using a polymer of composition similar to that used in Example 2, 100 parts by weight of the polymer were mixed with 60 parts by weight of silica, 12.5 parts by weight of di-octyl phthalate and the additives shown in Table V. Except for the control, Experiment No. 9, these compounds were then subjected to shearing at an elevated temperature on a rubber mill for 3 minutes at 150° C. After cooling, the compounds were mixed with the vulcanization active compounds shown in Table V and vulcanized by heating at 166° C. for 15 minutes. The properties of the vulcanizates were determined and show that the elevated temperature shearing is necessary and that the presence of an amine or of a metal stearate during the elevated temperature shearing does not detract from the achievement of improved properties in the vulcanizates.

TABLE V

| Exp. No. | 9 | 10 | 11 | 12 | 13 | 14 | 15 |
|---|---|---|---|---|---|---|---|
| Polymer wt. | 100 | 100 | 100 | 100 | 100 | 100 | 100 |
| Silica wt. | 60 | 60 | 60 | 60 | 60 | 60 | 60 |
| Di-octyl phthalate wt. | 12.5 | 12.5 | 12.5 | 12.5 | 12.5 | 12.5 | 12.5 |
| Armeen*T wt. | — | — | 1.5 | — | — | 1.5 | — |
| Zinc stearate wt. | — | — | — | 2 | — | — | — |
| Sodium stearate wt. | — | — | — | — | — | — | 2 |
| Heat treat | No | Yes | Yes | Yes | Yes | Yes | Yes |
| Zinc oxide wt. | 5 | 5 | 5 | 5 | 5 | 5 | 5 |
| Stearic acid wt. | 1.5 | 1.5 | 1.5 | 1.5 | 1.5 | 1.5 | 1.5 |
| DiCup* 40C wt. | — | — | — | — | 3 | 3 | 3 |
| Benzothiazyl disulphide wt. | 1.5 | 1.5 | 1.5 | 1.5 | — | — | — |
| Tetramethyl thiuram disulphide wt. | 0.5 | 0.5 | 0.5 | 0.5 | — | — | — |
| Sulphur wt. | 1.75 | 1.75 | 1.75 | 1.75 | — | — | — |

Vulcanize 15 minutes at 166° C.

TABLE V-continued

| Exp. No. | 9 | 10 | 11 | 12 | 13 | 14 | 15 |
|---|---|---|---|---|---|---|---|
| Vulcanizate properties | | | | | | | |
| Tensile strength kg/cm$^2$ | 271 | 299 | 277 | 287 | 243 | 246 | 241 |
| Elongation % | 590 | 480 | 510 | 480 | 480 | 480 | 500 |
| 100% modulus kg/cm$^2$ | 25 | 25 | 15 | 22 | 25 | 23 | 27 |
| 300% modulus kg/cm$^2$ | 101 | 160 | 116 | 153 | 140 | 139 | 135 |
| 25% modulus kg/cm$^2$ | 13 | 8 | 6 | 7 | 7 | 7 | 9 |
| Young's modulus kg/cm$^2$ | 303 | 82 | 41 | 58 | 50 | 44 | 65 |
| Tensile set % | 20 | 10 | 11 | 11 | 10 | 9 | 10 |
| Hardness Shore A | 82 | 73 | 68 | 71 | 71 | 60 | 72 |

*Registered Trade Mark

What is claimed is:

1. A process for the production of improved silica filled rubbery vulcanizates which process comprises preparing a mixture comprising 100 parts by weight of a vulcanizable hydrocarbyl polymer containing from about 4 to about 60 millimoles of epoxy groups per 100 grams of polymer, and from about 5 to about 100 parts by weight of silica, subjecting said mixture to a treatment wherein it is sheared for a time of from about 0.25 to about 10 minutes at a temperature of from about 100° to about 175° C., cooling said mixture, incorporating into said mixture vulcanization active compounds and vulcanizing by heating at an elevated temperature to produce the improved vulcanizate, said vulcanizable hydrocarbyl polymer being selected from C$_4$–C$_6$ conjugated diolefin polymers containing epoxy groups and from epoxy group containing polymers of a C$_4$–C$_6$ conjugated diolefin and at least one other copolymerizable vinyl or vinylidene-containing monomer, and said silica has an average particle size of about 0.01 to about 0.1 microns.

2. The process of claim 1 wherein said mixture also contains from about 0.5 to about 5 parts by weight of an additive selected from the sodium, potassium, zinc, calcium or ammonium salts of the C$_{15}$–C$_{20}$ fatty acids or from amines of formula R—NH$_2$, R—NHR' and R—NR"R"' where R is a C$_4$–C$_{30}$ linear or branched alkyl or alkylene group which may contain up to three NH$_2$, NH or NR" groups, R' is a C$_4$–C$_{30}$ linear or branched alkyl or alkylene group, and R" and R"', which may be the same or different, is a C$_1$–C$_{10}$ alkyl group.

3. The process of claim 1 wherein the mixture is sheared for a time of from 0.5 to 5 minutes at a temperature of from 120° to 160° C.

4. An improved silica filled rubbery vulcanizate obtained by the vulcanization of a mixture comprising 100 parts by weight of a vulcanizable hydrocarbyl polymer containing from about 4 to about 60 millimoles of epoxy groups per 100 grams of polymer, and from about 5 to about 100 parts by weight of silica, said mixture having been subjected to shearing at a temperature of from about 100° to about 175° C. prior to incorporation of vulcanization active compounds and vulcanization, said shearing being for a time of from about 0.25 to about 10 minutes, said vulcanizable hydrocarbyl polymer being selected from C$_4$–C$_6$ conjugated diolefin polymers containing epoxy groups and from epoxy group containing polymers of a $C_4$-$C_6$ conjugated diolefin and at least one other copolymerizable vinyl or vinylidene-containing monomer, and said silica having an average particle size of about 0.01 to about 0.1 microns.

5. The vulcanizate of claim 4 in which the hydrocarbyl polymer is a styrene-butadiene or a butadiene-acrylonitrile polymer containing copolymerized therewith a monomer selected from glycidyl acrylate or methacrylate, vinyl cyclohexene monoxide, allyl glycidyl ether and methallyl glycidyl ether.

6. The vulcanizate of claim 5 wherein the hydrocarbyl polymer is a mixture of a styrene-butadiene polymer or a butadiene-acrylonitrile polymer with a styrene-butadiene or a butadiene-acrylonitrile polymer containing copolymerized epoxy monomer in which the concentration of epoxy groups is from about 10 to about 60 millimoles per 100 grams of polymer, the concentration in the mixture of the styrene-butadiene or butadiene-acrylonitrile polymer containing copolymerized epoxy monomer being such that the concentration of epoxy groups in the mixture is from about 4 to about 40 millimoles per 100 grams of mixture.

7. The vulcanizate of claim 4 wherein said mixture also contains from about 0.5 to about 5 parts by weight of an additive selected from the sodium, potassium, zinc, calcium or ammonium salts of the $C_{15}$-$C_{20}$ fatty acids or from amines of formula $$R-NH_2, R-NHR' \text{ and } R-NR''R'''$$

where R is a $C_4$-$C_{30}$ linear or branched alkyl or alkylene group which may contain up to three $NH_2$, NH or NR'' groups, R' is a $C_4$-$C_{30}$ linear or branched alkyl or alkylene group, and R'' and R''', which may be the same or different, is a $C_1$-$C_{10}$ alkyl group.

8. The vulcanizate of claim 7 in which the hydrocarbyl polymer is a styrene-butadiene or a butadiene-acrylonitrile polymer containing copolymerized therewith a monomer selected from glycidyl acrylate or methacrylate, vinyl cyclohexene monoxide, allyl glycidyl ether and methallyl glycidyl ether.

* * * * *